A. MORRIS.
AVIATOR'S LEVEL.
APPLICATION FILED MAY 31, 1918.
1,284,421.
Patented Nov. 12, 1918.
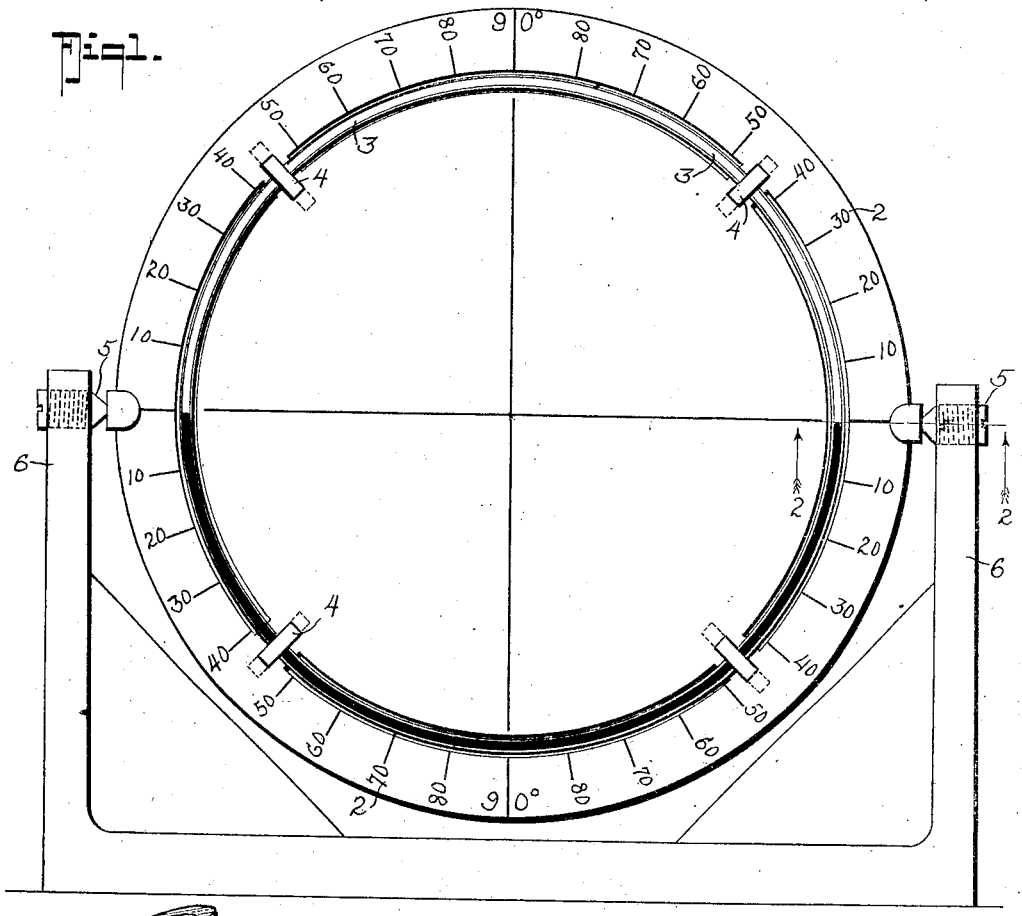
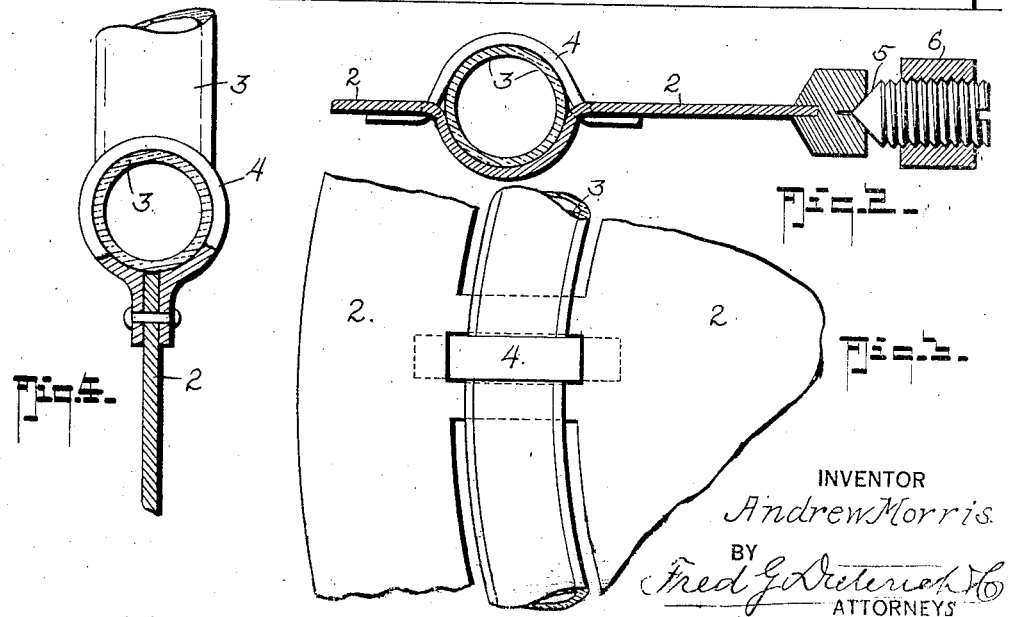
INVENTOR
Andrew Morris.
BY
Fred G. Dieterich
ATTORNEYS

UNITED STATES PATENT OFFICE.

ANDREW MORRIS, OF VANCOUVER, BRITISH COLUMBIA, CANADA.

AVIATOR'S LEVEL.

1,284,421.  Specification of Letters Patent.   Patented Nov. 12, 1918.

Application filed May 31, 1918. Serial No. 237,533.

*To all whom it may concern:*

Be it known that I, ANDREW MORRIS, a citizen of the Dominion of Canada, residing at Vancouver, in the Province of British Columbia, Canada, have invented certain new and useful Improvements in Aviators' Levels, of which the following is a specification.

This invention relates to a level which is designed to indicate to an aviator the inclination of his machine from the horizontal.

The invention is particularly described in the following specification, reference being made to the drawings by which it is accompanied, in which:

Figure 1 is a side elevation of the level, and

Figs. 2 and 3 are enlarged details of the pivotal support of the plate and attachment of the level tube thereto.

Fig. 4 is a cross section of a modified construction of means for securing the tube to the outer ring.

The device comprises a flat ring or plate 2 which is graduated in degrees each way from the horizontal axis to ninety degrees. A glass tube 3 formed into a circle is secured on or in the plate 2 to be concentric with it and this tube is half filled with a mobile liquid such as alcohol or quicksilver. The plate 2 with its concentric tube 3 is suspended between end centers 5 or on ball bearings to move freely about its zero diameter within a frame or stand 6.

The plate will by the preponderating weight of the fluid in the lower half of the tubular ring 3 maintain a substantially vertical position laterally and the fluid will maintain its level in the tube as the plate 2 is inclined to any angle in a fore and aft line, and will thereby indicate to an aviator the angle at which his machine is rising or falling.

To enable the reading of the dial to be made at night the surface of the plate 2 or its graduation marks should be painted with any suitable light emitting material and similarly the liquid or the space in the tube may be rendered light emitting.

In the drawing the tubular ring 3 is shown as supported with its axis in the plane of the mid-thickness of the plate 2 by clips 4, which is a simple and effective way of securing the tube, and renders it available for reading the angle off either side of the plate.

In Fig. 4 is shown a modified construction of means for securing the tube 3 to the outer ring portion of the plate 2. In this construction, the clip member 4 is shown as riveted directly to the outer ring portion 2 and with this form of securing means, the inner or center portion of the plate 2 may be entirely omitted.

Having now particularly described my invention, I hereby declare that what I claim as new and desire to be protected in by Letters Patent, is:

1. An aviator's level, comprising a plate graduated in degrees from points diametrically opposite one another in the plane of the plate, means for freely pivoting said plate at said diametrically opposite points, and a tube bent to a circle concentric with the graduated plate and secured thereto with the axis of the tube in the approximate plane of the plate, said tube being half filled with a mobile liquid.

2. An aviator's level, comprising a circular plate, means for freely suspending said plate from the ends of a diameter in a suitable frame, said ring graduated in degrees from each point of suspension to the quarter circle, and a tube bent to a circle concentric with the graduated plate to which it is secured in the plane of the mid-thickness of the plate.

In testimony whereof I affix my signature.

ANDREW MORRIS.